US008006729B2

(12) United States Patent  (10) Patent No.: US 8,006,729 B2
Ebiko  (45) Date of Patent: Aug. 30, 2011

(54) PNEUMATIC TIRE WITH TREAD HAVING FINE GROOVES

(75) Inventor: Masahiro Ebiko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 929 days.

(21) Appl. No.: 11/921,493

(22) PCT Filed: Jun. 6, 2006

(86) PCT No.: PCT/JP2006/311283
§ 371 (c)(1),
(2), (4) Date: Nov. 30, 2007

(87) PCT Pub. No.: WO2006/132216
PCT Pub. Date: Dec. 14, 2006

(65) Prior Publication Data
US 2009/0101259 A1   Apr. 23, 2009

(30) Foreign Application Priority Data
Jun. 10, 2005   (JP) .................................. 2005-170820

(51) Int. Cl.
*B60C 11/12*   (2006.01)
(52) U.S. Cl. ........ 152/209.15; 152/209.28; 152/DIG. 3; 152/904
(58) Field of Classification Search ............. 152/209.15, 152/209.18, 209.28, DIG. 3, 904
See application file for complete search history.

(56) References Cited

U.S. PATENT DOCUMENTS

| 5,435,364 | A  | * | 7/1995  | Hasegawa et al. | ........ 152/209.28 |
| 6,003,574 | A  |   | 12/1999 | Boiocchi et al. | |
| 6,478,062 | B1 | * | 11/2002 | Schomburg       | ............. 152/DIG. 3 |
| 2004/0238091 | A1 | * | 12/2004 | Watanabe     | ................... 152/209.1 |
| 2005/0167022 | A1 | * | 8/2005  | Hashimoto    | .............. 152/DIG. 3 |

FOREIGN PATENT DOCUMENTS

| DE | 3901624    | * | 8/1989 |
| JP | 3-38406    |   | 2/1991 |
| JP | 03-220004  | * | 9/1991 |
| JP | 7-186633   |   | 7/1995 |
| JP | 07-186633  | * | 7/1995 |

(Continued)

OTHER PUBLICATIONS

Translation for Japan 07-186633 (no date).*

(Continued)

*Primary Examiner* — Steven D Maki
(74) *Attorney, Agent, or Firm* — Greer, Burns & Crain, Ltd.

(57) ABSTRACT

Disclosed is a pneumatic tire including a plurality of land portions and a plurality of fine grooves. The plurality of land portions are formed of blocks and a rib, and are defined in a tread part of the pneumatic tire. The fine grooves with a depth of 0.1 mm to 0.8 mm, a width of 0.1 mm to 0.8 mm and a pitch of 0.5 mm to 2.0 mm are formed in the tread surface of each of the land portions to be inclined at an angle of 42° to 60° relative to the circumferential direction of the tire. The inclined directions of the fine grooves relative to the circumferential direction of the tire are reverse to each other on the left and right sides of the equator of the tire.

11 Claims, 1 Drawing Sheet

| FOREIGN PATENT DOCUMENTS | | | |
|---|---|---|---|
| JP | 9-188111 | | 7/1997 |
| JP | 11-165509 | * | 6/1999 |
| JP | 2002-29225 | | 1/2002 |
| JP | 2002-67621 | | 3/2002 |
| JP | 2002-103919 | * | 4/2002 |
| JP | 2004-034902 | * | 2/2004 |
| JP | 2004-34903 | | 2/2004 |
| JP | 2006-151230 | | 6/2006 |

OTHER PUBLICATIONS

Machine translation for Japan 2002-103919 (no date).*
Translation for Japan 03-220004 (no date).*
Machine translation for Japan 11-165509 (no date).*
Machine translation for German 3901624 (no date).*

* cited by examiner

PNEUMATIC TIRE WITH TREAD HAVING FINE GROOVES

TECHNICAL FIELD

The present invention relates to a pneumatic tire. Specifically, the present invention relates to a pneumatic tire that includes fine grooves formed in the tread surface for compensating for the lack of the initial performance of the tire, and that makes it possible to easily see whether or not the tire can maximize the potential from the peeling off of the tread surface.

BACKGROUND ART

In general, at the beginning of use of a pneumatic tire, the pneumatic tire does not sufficiently maximize the potential. This is because a mold release lubricant, which has been applied to the mold surface for the purpose of improving the releasability of the pneumatic tire from the mold in a curing process, remains on the tread surface of the pneumatic tire. Accordingly, break-in of the pneumatic tire for a certain distance is necessary to wear off the tread surface of the pneumatic tire so that the genuine tread rubber can be exposed to the outside. After the break-in, the pneumatic tire can eventually maximize the potential.

For the purpose of compensating for the lack of the performance of a tire during the break-in run, Patent Document 1 proposes the following technique. Specifically, a plurality of fine grooves with a depth of 0.1 mm to 0.8 mm, a width of 0.1 mm to 0.8 mm, and a pitch of 0.5 mm to 2.0 mm, are formed in parallel in the tread surface of a pneumatic tire. Concurrently, each of the fine grooves is inclined at 42° to 60° relative to the circumferential direction of the tire. Accordingly, the fine grooves compensate for the lack, at the beginning of use, of the braking and driving performance until the tread surface is worn out.

However, the progression of wear of the tread surface of a pneumatic tire is not uniform over the entire ground-contacting surface. For this reason, even when the above-described shallow fine grooves are provided, it is difficult for general drivers to determine whether or not the tire can maximize the potential.

Patent Document 1: Japanese patent application Kokai publication No. 2004-34903

DISCLOSURE OF THE INVENTION

An object of the present invention is to provide a pneumatic tire that includes fine grooves formed in the tread surface for compensating for the lack of the initial performance, and that makes it possible to easily see whether or not the tire can maximize the potential.

A pneumatic tire of the present invention for achieving the object includes a plurality of land portions and a plurality of fine grooves. The land portions are formed of blocks and a rib, and are defined in a tread part of the pneumatic tire. The fine grooves are formed in the tread surface of each of the land portions. Concurrently, the fine grooves have a depth of 0.1 mm to 0.8 mm, a width of 0.1 mm to 0.8 mm and a pitch of 0.5 mm to 2.0 mm, while the fine grooves are inclined at an angle of 42° to 60° relative to the circumferential direction of the tire. Moreover, in the pneumatic tire, the inclined directions of the fine grooves relative to the circumferential direction of the tire are set reverse to each other on the left and right sides of the equator of the tire.

According to the pneumatic tire of the present invention, the inclined directions of the fine grooves relative to the circumferential direction of the tire are set reverse to each other on the left and right sides of the equator of the tire. Accordingly, it is possible to make frictional forces acting on the ground-contacting surface uniform with respect to the land portions on the two sides of the equator of the tire, and to thus cause the fine grooves to be uniformly worn. As a result, the driver can visually and easily determine whether or not the tire can maximize the potential.

BEST MODES FOR CARRYING OUT THE INVENTION

Figure 1:
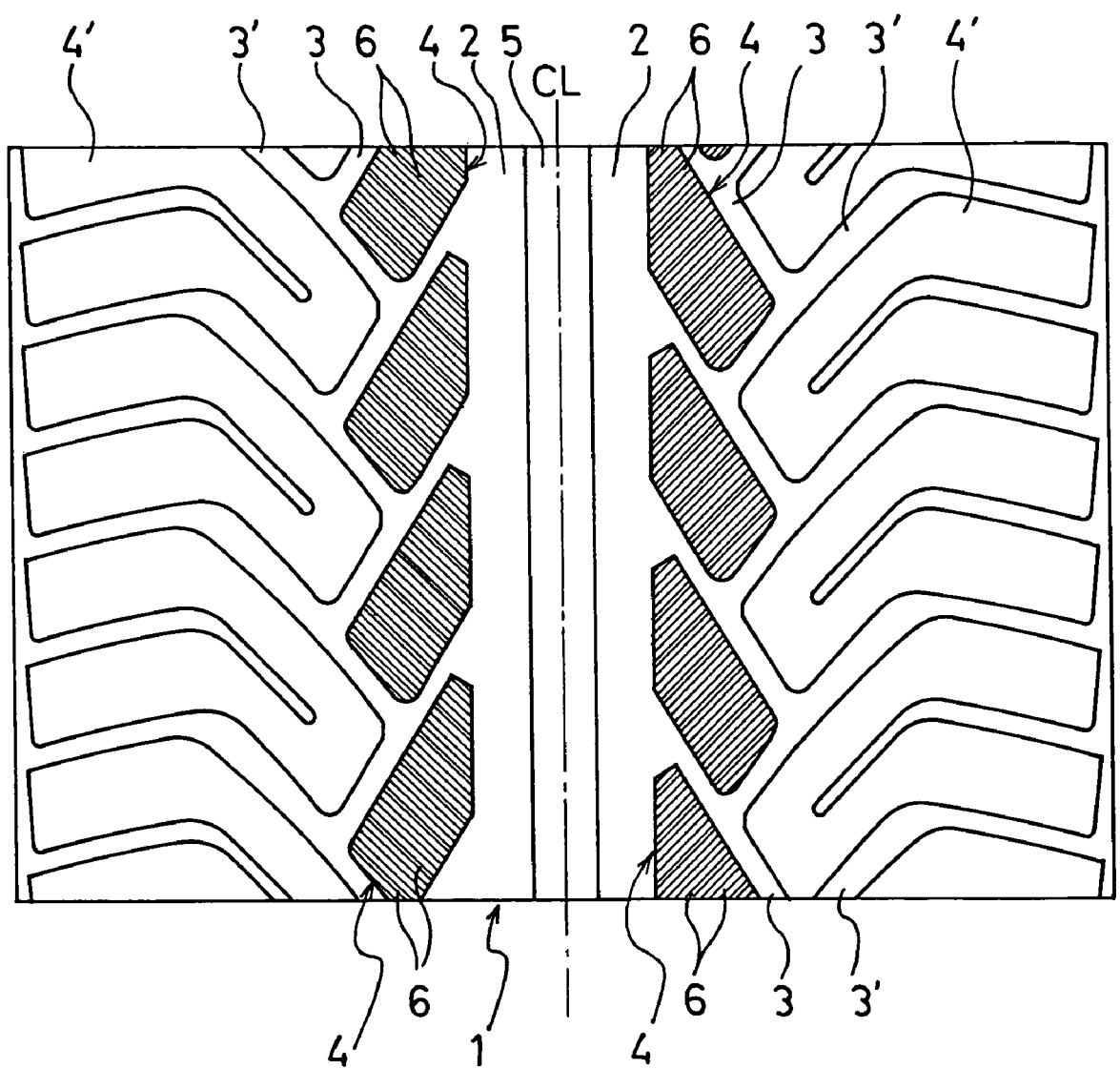
FIG. 1 is an expanded view showing a embodiment of a tread part of the pneumatic tire according to the present invention.

Hereinafter, the present invention will be described in detail.

As shown in FIG. 1, a pair of main grooves 2, 2, each extending in the circumferential direction of the tire, are provided in the center portion of a tread part 1. In addition, a plurality of lateral grooves 3 and a plurality of lateral grooves 3' are provided in the tread part 1. The plurality of lateral grooves 3 extend obliquely in the width direction of the tire from each main groove 2. Each of the plurality of lateral grooves 3' extends from the middle portion of the corresponding one of the lateral grooves 3 in a state of being inclined in the opposite direction to the lateral grooves 3, and is then bent in the form of an inversion shape of "V". The land portions are defined by these main grooves 2, 2' and lateral grooves 3, 3'. The land portions are formed of a rib 5 in the center, and a plurality of blocks 4, 4' forming two rows on each side of the rib 5. A large number of fine grooves 6, which are aligned at fine pitches, are formed in the tread surface of each of the blocks 4 forming two rows on the inner side of the tire among these land portions. Each of the fine grooves 6 has a depth of 0.1 mm to 0.8 mm, a width of 0.1 mm to 0.8 mm, while the pitch of the fine grooves 6 is 0.5 mm to 2.0 mm. Moreover, each of the fine grooves 6 is inclined at 42° to 60° relative to the circumferential direction of the tire. The fine grooves 6 produce an effect of compensating, with the edge effect thereof, the braking and driving performance, which is reduced by the tread surface of a new tire.

The tread pattern shown in FIG. 1 is symmetrical about the equator CL of the tire, while the portions of the pattern on the left and right sides are slightly displaced (offset) from each other in the circumferential direction of the tire. In addition, the fine grooves 6 formed in the surfaces of the blocks 4 are inclined relative to the circumferential direction of the tire, and the inclined directions of the fine grooves 6 are reverse to each other on the right and left sides of the equator CL of the tire. Since the fine grooves 6 are inclined in the directions reverse to each other on the left and right sides of the equator CL of the tire, convex portions, each between adjacent two of the fine grooves 6, are worn uniformly on the two block rows. Moreover, since the portions of the tread pattern on the left and right sides are slightly displaced from each other with respect to the equator CL of the tire, the effect of uniformly wearing the tread surface can be further improved.

Suppose a case where a large number of fine grooves are formed in parallel to one another in the land portions of the tread part in the present invention. When a frictional force acts in a direction orthogonal to the direction of the fine grooves, the convex portion between each adjacent two fine grooves is likely to be worn. On the other hand, when a frictional force acts in a direction parallel to the direction of the fine grooves, the convex portion between each adjacent two fine grooves is unlikely to be worn. The reason for this phenomenon is supposed to be that the convex portion between each adjacent two fine grooves exhibits the minimum rigidity in a direction orthogonal to the direction of the fine grooves while exhibiting the maximum rigidity in the same direction as that of the fine grooves. Accordingly, when the fine grooves are formed only along one direction, a direction in which the convex portions are likely to be worn and a direction in which the convex portions are unlikely to be worn both exist unevenly to a large extent. For this reason, the ground-contacting surfaces of the land portions are unevenly worn to be difficult to be uniformly worn out.

In the present invention, the inclined directions of the fine grooves formed in the land portions of the tread part are reverse to each other on the two sides of the equator CL of the tire. Accordingly, the land portions having the fine grooves formed therein are uniformly worn by frictional forces acting on the ground-contacting surface in directions of a wider range.

The inclination angle of these fine grooves 6 relative to the circumferential direction of the tire is 42° to 60°, and preferably be 45° to 55°. When the inclination angle of the fine grooves is less than 42°, there is a tendency that the convex portion between each adjacent two fine grooves is unlikely to be worn at the time of cornering. On the other hand, when the inclination angle is more than 60°, there is a tendency that the convex portion between each adjacent two fine grooves is unlikely to be worn at the time of braking or driving. Accordingly, such angles are not preferable.

In addition, the depth of each fine groove 6 is 0.1 mm to 0.8 mm, and preferably be 0.3 mm to 0.5 mm. When the depth of each fine groove is less than 0.1 mm, there is a tendency that the wearing of the fine grooves becomes visually difficult to check. On the other hand, when the depth of each fine groove is more than 0.8 mm, there is a concern that the driving stability is deteriorated. Accordingly, such depths are not preferable.

The width of each fine groove 6 is 0.1 mm to 0.8 mm, and preferably be 0.3 mm to 0.5 mm. When the width of each groove is less than 0.1 mm, there is a tendency that the wearing of the fine grooves becomes visually difficult to check. On the other hand, when the width of each groove is more than 0.8 mm, there is a concern that the driving stability is deteriorated. Accordingly, such widths are not preferable.

Moreover, the pitch of the fine grooves is 0.5 mm to 2.0 mm, and preferably be 0.8 mm to 1.8 mm. When the pitch of the fine grooves 6 is less than 0.5 mm, there is a concern that the driving stability is deteriorated. On the other hand, when the pitch of the fine grooves 6 is more than 2.0 mm, the convex portion between each adjacent two fine grooves is unlikely to be worn, so that the break-in run tends to take longer time. Accordingly, such pitches are not preferable.

Alternatively, the following configuration is another preferable embodiment of the present invention. Specifically, blocks 4 are symmetrically arranged about the equator CL of the tire, while a plurality of fine grooves 6 are formed in the surfaces of the blocks 4 that are arranged in the center region of the tread part. Concurrently, the plurality of fine grooves 6 are inclined relative to the circumferential direction of the tire in a manner of being symmetrical about the equator CL of the tire. In this case, it is preferable that the fine grooves 6 are arranged to be substantially orthogonal to the direction of the blocks 4 symmetrically arranged about the equator CL of the tire, in a manner that the fine grooves 6 are symmetrical about the equator CL of the tire. This makes it possible to cause the land portions, in which the fine grooves 6 are formed, to be uniformly worn by frictional forces acting at angles of a wider range.

In addition, in the present invention, it is more preferable that the land portions constituted of the blocks and the rib be arranged to form a directional pattern. When the arrangement of the land portions in a directional pattern is combined with the employment of the fine grooves inclined in directions reverse to each other on the two sides of the equator of the tire, it is possible to cause the ground-contacting land portions to be uniformly worn without unevenness.

In the present invention, it is also preferable that the absolute values of the angles, at which the fine grooves are inclined relative to the circumferential direction of the tire, be different on the two sides of the equator of the tire from each other. In addition, it is also preferable that the fine grooves formed in the land portions be inclined at, at least, two different angles relative to the circumferential direction of the tire, on one side of the equator of the tire.

For example, the following configuration may be employed. Specifically, fine grooves, which are inclined up to the right at two inclination angles of 45° and 60° relative to the circumferential direction of the tire, are formed on a first side of the equator CL of the tire. Concurrently, fine grooves, which are inclined down to the right at a inclination angle of 45° relative to the circumferential direction of the tire, are formed on the second side of the equator CL of the tire. The fine grooves formed on the first side of the equator CL of the tire may be inclined at a different angle in each block. Alternatively, the fine grooves are bent to change the inclination angle thereof in each one of the blocks.

The forming of the fine grooves having inclination angles different from each other on the two sides of the equator CL of the tire makes it possible to cause the convex portion between each adjacent two fine grooves to be worn against frictional forces acting at angles of a wider range. Accordingly, the tread surface can be uniformly worn.

Note that, it is preferable that the inclination angles of the fine grooves formed in the land portions have a certain directional characteristic on each side of the equator CL of the tire. For example, when fine grooves, formed on the left side of the equator CL of the tire, are inclined down to the right, the fine grooves may be inclined at various angles as long as being inclined down to the right. In this case, fine grooves, formed on the right side of the equator CL of the tire, are inclined up to the right, that is, reverse to the fine grooves on the left side, and may be inclined at various angles as long as being inclined up to the right.

In the same manner, then the fine grooves, formed on the left side of the equator CL of the tire, are inclined up to the right, the fine grooves may be inclined at any angles as long as being inclined up to the right. In this case, the fine grooves, formed on the right side of the equator CL of the tire, are inclined down to the right, that is, reverse to the fine grooves on the left side, and may be inclined at any angles. The provision of a certain directional characteristic to the inclination angles of the fine grooves on each side of the equator CL of the tire helps to make the wear pattern uniform at the times of braking and driving, or at the time of left and right cornering.

The fine grooves may be formed in only at least some of the land portions defined in the tread part, or may be formed in all the ground-contacting land portions. Since the land portions having the fine grooves formed therein compensate for the lack, at the beginning of use, of the braking and driving performance of the pneumatic tire, it is preferable to form the fine grooves in an area as wide as possible. In addition, when the completion of the break-in run is determined by checking the wear of the fine grooves, the surface condition of the ground-contacting land portions in the wide area can be visually checked.

In the present invention, the fine grooves may be formed only in the land portions defined in a center region, with respect to the width in which the land portions are brought into contact with the ground. Specifically, suppose a case where a pneumatic tire is likely to be worn particularly in the shoulder regions of the tread part, as in the case where the pneumatic tires are mounted on the steering wheels. In such a case, the forming of the fine grooves only in the land portions in the center region improves the uniformity of wear of the fine grooves. Note that, the center region, where the land portions are defined, may preferably be a region that extends from the equator of the tire by ±40% of the tread contact width on each of the left and right side of the equator.

In the present invention, the fine grooves may be formed in only the land portions defined in peripheral regions, with respect to the width in which the land portions are brought into contact with the ground. Specifically, suppose a case where a pneumatic tire is likely to be worn particularly in the center region of the tread part, as in the case where the pneumatic tires are mounted on the drive wheels. In such a case, the forming of the fine grooves only in the land portions in the peripheral regions improves the uniformity of wear of the fine grooves. Note that, the peripheral regions, where the land portions are defined, may preferably be regions outside a region that extends from the equator of the tire by ±40% of the tread contact width on each of the left and right side of the equator.

Here, the tread contact width is a contact width obtained when a pneumatic tire mounted on a standard rim defined in JATMA year book (the 2003 version) is inflated with a test air pressure of 180 kPa, and is loaded with 88% of the maximum load capacity.

On a rear-wheel drive vehicle, it is preferable that the pneumatic tires according to the present invention be installed in the following manner. Pneumatic tires each having fine grooves formed in only land portions in the center region are mounted on the front wheels while pneumatic tires each having fine grooves formed in only land portions in the peripheral regions are mounted on the rear wheels. On the other hand, on a front-wheel drive vehicle, it is preferable that the pneumatic tires according to the present invention be installed in the following manner. Pneumatic tires each having fine grooves formed in only land portions in the center region are mounted on the rear wheels while pneumatic tires each having fine grooves in only land portions in the peripheral regions are mounted on the front wheels.

Suppose a case where the pneumatic tires are installed on a vehicle in the above-described manner. During break-in run of this vehicle, the surfaces of the land portions having the fine grooves formed therein can be uniformly worn, while the initial braking and driving performance of the pneumatic tires is compensated by the fine grooves. Moreover, the driver can easily check visually whether or not the fine grooves formed in the land portions are worn out, accurately determining the completion of break-in run.

Although, the present invention will be further described below by using examples, the scope of the present invention is not limited to these examples.

Pneumatic tires each having a tire size of 295/45R20 and a rim size of 20×10 J were prepared. The air pressure for the test was set at 260 kPa for each pneumatic tire, and the pneumatic tire was installed on a 4700 cc AWD vehicle. Then, the AWD vehicle was driven on a test course of 2 km per round, and the tread part of the tire was observed for every round.

The state of wear (the state of scuffed-in) of the land portions of the tread part was checked. The roughness of the surface of the tread rubber was visually checked when all the fine grooves are worn out, so that each tire was evaluated with the following 5 grades.

1. The land portions were not scuffed.

2. The land portions were in a state of uneven wear, where approximately 50% of the surface area was scuffed.

3. The land portions were in a state where approximately 75% of the surface area was scuffed.

4. The land portions were in a state where approximately 90% of the surface area was scuffed.

5. The land portions were in a state where 100% of the surface area was scuffed.

EMBODIMENT 1

A pneumatic tire with the following configuration was prepared. Specifically, fine grooves were formed in the entire ground-contacting region of land portions in the tread part to be symmetrical about the equator of the tire, while the land portions had a tread pattern symmetrical about the equator of the tire. The inclination angle of each fine groove relative to the circumferential direction of the tire was 50°. The depth and the width of each fine groove were 0.4 mm and 0.4 mm, respectively. The pitch of the fine grooves was 1.3 mm.

The prepared pneumatic tire was broken in, in the above-described manner, to be evaluated in terms of the state of wear of the land portions of the tread part. The result of the evaluation is shown in Table 1.

TABLE 1

|  | Embodiment 1 | Embodiment 2 | Embodiment 3 | Embodiment 4 | Embodiment 5 | Embodiment 6 | Embodiment 7 | Comparative Example 1 | Comparative Example 2 |
| --- | --- | --- | --- | --- | --- | --- | --- | --- | --- |
| Pattern of Land Portions | Symmetrical about Equator | Symmetrical and Displaced with Respect to Equator | Symmetrical and Displaced with Respect to Equator | Symmetrical and Displaced with Respect to Equator | Symmetrical and Displaced with Respect to Equator | Symmetrical and Displaced with Respect to Equator | Directional Pattern | Symmetrical about Equator | Symmetrical about Equator |
| Symmetricity of Fine grooves | Symmetrical about Equator in V-shape | Symmetrical about Equator in V-shape | Asymmetric | Symmetrical about Equator in V-shape | Symmetrical about Equator in V-shape | Symmetrical about Equator in V-shape | Symmetrical about Equator in V-shape | — | 1 direction |

TABLE 1-continued

|  |  | Embodiment 1 | Embodiment 2 | Embodiment 3 | Embodiment 4 | Embodiment 5 | Embodiment 6 | Embodiment 7 | Comparative Example 1 | Comparative Example 2 |
|---|---|---|---|---|---|---|---|---|---|---|
| Angle of Fine grooves [°] | | 50 | 50 | Left(In)45 Right(Out)60 | 50 | 50 | 50 | 45 to 60 | | 50 |
| Range of Forming Fine grooves | Front Wheel | Entire Ground Contacting Surface | Entire Ground Contacting Surface | Entire Ground Contacting Surface | Center Region Center Region | Peripheral Region Peripheral Region | Center Region Peripheral Region | Entire Ground Contacting Surface | | Entire Ground Contacting Surface |
| | Rear Wheel | | | | | | | | | |
| Running Distance [Km] | | 50 | 50 | 44 | 50 | 50 | 50 | 40 | 50 | 50 |
| Wear Characteristic of Land Portions | Front Wheel | 3 | 3 | 4 | 4 | 3 | 4 | 4 | 1 | 2 |
| | Rear Wheel | 3 | 3 | 4 | 3 | 4 | 4 | 4 | 1 | 2 |

EMBODIMENT 2

A pneumatic tire was prepared in the same manner as in the case of Embodiment 1, except the following configuration. Specifically, the pneumatic tire of Embodiment 2 had the tread part with a shape symmetrical about the equator of the tire. Concurrently, land portions were arranged on the left and right sides of the equator to be displaced from each other in the circumferential direction by approximately 25% of the pitch in the tread part. Then, the same break-in run and evaluation as those in the case of Embodiment 1 were performed on the pneumatic tire of Embodiment 2. The result of the evaluation is shown in Table 1. It was demonstrated that the pneumatic tire of Embodiment 2 was the same as that of Embodiment 1 in terms of, the uniformity of wear of the land portions of the tread part, the visibility of the wear-out of the fine grooves, and the like. Moreover, in addition, a reduction in running noise was obtained.

EMBODIMENT 3

A pneumatic tire was prepared in the same manner as in the case of Embodiment 1, except the following configuration. Specifically, the pneumatic tire of Embodiment 3 had the same shape of the tread part as that of Embodiment 2. Concurrently, fine grooves were formed to be inclined, at 45° on the left side (on the inner side at the time when the tire was installed in the vehicle) of the equator of the tire, and at 60° on the right side (on the outer side at the time when the tire was installed in the vehicle) thereof. Then, the same break-in run and evaluation as those in the case of Embodiment 1 were performed on the pneumatic tire of Embodiment 3. The result of the evaluation is shown in Table 1.

EMBODIMENT 4

A pneumatic tire was prepared in the same manner as in the case of Embodiment 1, except the following configuration. Specifically, the pneumatic tire of Embodiment 4 had the same shape of the tread part as that of Embodiment 2. Moreover, fine grooves were formed in only independent blocks in a center region that extends from the equator of the tire by ±40% of the tread contact width on each of the left and right side of the equator. Concurrently, the fine grooves had inclination angles symmetrical about the equator of the tire. Then, the same break-in run and evaluation as those in the case of Embodiment 1 were performed on the pneumatic tire of Embodiment 4. The result of the evaluation is shown in Table 1.

EMBODIMENT 5

A pneumatic tire was prepared in the same manner as in the case of Embodiment 1, except the following configuration. Specifically, the pneumatic tire of Embodiment 5 had the same shape of the tread part as that of Embodiment 2. Moreover, fine grooves were formed in only independent blocks in the peripheral regions outside a region that extends from the equator of the tire by ±40% of the tread contact width on each of the left and right side of the equator. Concurrently, the fine grooves had inclination angles symmetrical about the equator of the tire. Then, the same break-in run and evaluation as those in the case of Embodiment 1 were performed on the pneumatic tire of Embodiment 5. The result of the evaluation is shown in Table 1.

EMBODIMENT 6

The same break-in run and evaluation as those in the case of Embodiment 1 were performed in the same manner as that in the case of Embodiment 1, except the following configuration. Specifically, the same pneumatic tires as that of Embodiment 4 were mounted on the front wheels, while the same pneumatic tires as that of Embodiment 5 were mounted on the rear wheels. The result of the evaluation is shown in Table 1.

EMBODIMENT 7

A pneumatic tire was prepared in the same manner as that in the case of Embodiment 1, except the following configuration. Specifically, the shape of the tread part of the pneumatic tire of Embodiment 7 was a directional pattern. Moreover, fine grooves are formed in a manner that the inclination angle of the fine grooves gradually varied from 45° to 60°, from the center portion on the inner side of the tire toward each peripheral portion on the outer sides of the tire. Then, the same break-in run and evaluation as those in the case of Embodiment 1 were performed on the pneumatic tire of Embodiment 7. The result of the evaluation is shown in Table 1.

COMPARATIVE EXAMPLE 1

A pneumatic tire having the same shape of the tread part as that of Embodiment 1 was prepared, except that fine grooves were not formed therein. The pneumatic tires of Comparative Example 1 were installed on the vehicle, and the same break-in run and evaluation as those in the case of Embodiment 1 were performed on the pneumatic tire of Comparative Example 1. The result of the evaluation is shown in Table 1.

COMPARATIVE EXAMPLE 2

A pneumatic tire having the same shape of the tread part as that of Embodiment 1 was prepared, except that fine grooves were formed to be inclined down to the right on each of the two sides of the equator of the tire. Then, the same break-in run and evaluation as those in the case of Embodiment 1 were performed on the pneumatic tire of Comparative Example 2. The result of the evaluation is shown in Table 1.

As is clear from Table 1, in the case of the pneumatic tire (Comparative Example 1) with no fine groove formed in the land portions of the tread part, the tread surface was unlikely to be worn (scuffed). In the case of the pneumatic tire (Comparative Example 2) with the fine grooves formed along one direction, unevenness (uneven wear) occurred in a range to be worn of the tread part.

On the other hand, in the case of each of the pneumatic tires of the present invention, since the fine grooves were formed to have the inclination reverse to each other on the two sides of the equator of the tire, the land portions of the tread part were worn uniformly. Moreover, it was confirmed that the visibility of wear of the fine grooves formed in the land portions was excellent, and hence that the time of completion of break-in run can be easily determined.

What is claimed is:

1. A pneumatic tire for a driving wheel comprising:
a plurality of land portions, formed of blocks and a rib, and defined in a tread part of the pneumatic tire; and
a plurality of fine grooves with a depth of 0.1 mm to 0.8 mm, a width of 0.1 mm to 0.8 mm and a pitch of 0.5 mm to 2.0 mm, the fine grooves formed in the tread surface of at least one of the land portions to be inclined at an angle of 42° to 60° relative to the circumferential direction of the tire, wherein
the inclined directions of the fine grooves relative to the circumferential direction of the tire are reverse to each other on the left and right sides of the equator of the tire, and
the fine grooves are formed in only the land portions defined in a center region that extends from the equator of the tire by ±40% of the tread contact width on each of the left and right side of the equator.

2. The pneumatic tire according to claim 1 wherein the plurality of land portions are arranged to form a directional pattern.

3. The pneumatic tire according to claim 1 wherein
the plurality of land portions are symmetrically arranged about the equator of the tire, and
the arrangement of the land portions on the left and right sides of the equator of the tire are displaced from each other in the circumferential direction of the tire.

4. The pneumatic tire according to claim 1 wherein the absolute value of the inclination angle of the fine grooves relative to the circumferential direction of the tire is different between the two sides of the equator of the tire.

5. The pneumatic tire according to claim 1 wherein, on one side of the equator of the tire, the fine grooves are inclined at least two different angles relative to the circumferential direction of the tire.

6. A pneumatic tire for a steering wheel comprising:
a plurality of land portions, formed of blocks and a rib, and defined in a tread part of the pneumatic tire; and
a plurality of fine grooves with a depth of 0.1 mm to 0.8 mm, a width of 0.1 mm to 0.8 mm and a pitch of 0.5 mm to 2.0 mm, the fine grooves formed in the tread surface of at least one of the land portions to be inclined at an angle of 42° to 60° relative to the circumferential direction of the tire, wherein
the inclined directions of the fine grooves relative to the circumferential direction of the tire are reverse to each other on the left and right sides of the equator of the tire, and
the fine grooves are formed in only the land portions defined in peripheral regions outside a center region that extends from the equator of the tire by ±40% of the tread contact width on each of the left and right side of the equator.

7. The pneumatic tire according to claim 6 wherein the plurality of land portions are arranged to form a directional pattern.

8. The pneumatic tire according to claim 6 wherein
the plurality of land portions are symmetrically arranged about the equator of the tire, and
the arrangement of the land portions on the left and right sides of the equator of the tire are displaced from each other in the circumferential direction of the tire.

9. The pneumatic tire according to claim 6 wherein the absolute value of the inclination angle of the fine grooves relative to the circumferential direction of the tire is different between the two sides of the equator of the tire.

10. The pneumatic tire according to claim 6 wherein, on one side of the equator of the tire, the fine grooves are inclined at least two different angles relative to the circumferential direction of the tire.

11. A vehicle comprising:
a first pneumatic tire mounted on each of the front wheels, each of said first pneumatic tires including:
a plurality of land portions, formed of blocks and a rib, and defined in a tread part of the pneumatic tire; and
a plurality of fine grooves with a depth of 0.1 mm to 0.8 mm, a width of 0.1 mm to 0.8 mm and a pitch of 0.5 mm to 2.0 mm, the fine grooves formed in the tread surface of each of the land portions to be inclined at an angle of 42° to 60° relative to the circumferential direction of the tire, wherein the inclined directions of the fine grooves relative to the circumferential direction of the tire are reverse to each other on the left and right sides of the equator of the tire, and further wherein the fine grooves are formed in only the land portions defined in a center region that extends from the equator of the tire by ±40% of the tread contact width on each of the left and right side of the equator; and
a second pneumatic tire mounted on each of the rear wheels, each of said second pneumatic tires including:
a plurality of land portions, formed of blocks and a rib, and defined in a tread part of the pneumatic tire; and
a plurality of fine grooves with a depth of 0.1 mm to 0.8 mm, a width of 0.1 mm to 0.8 mm and a pitch of 0.5 mm to 2.0 mm, the fine grooves formed in the tread surface of each of the land portions to be inclined at an angle of 42° to 60° relative to the circumferential direction of the tire, wherein the inclined directions of the fine grooves relative to the circumferential direction of the tire are reverse to each other on the left and right sides of the equator of the tire, and further wherein the fine grooves are formed in only the land portions defined in peripheral regions outside a center region that extends from the equator of the tire by ±40% of the tread contact width on each of the left and right side of the equator.

* * * * *